(12) United States Patent
Thürmer et al.

(10) Patent No.: US 10,965,074 B2
(45) Date of Patent: Mar. 30, 2021

(54) OBD ADAPTER

(71) Applicant: Webasto SE, Stockdorf (DE)

(72) Inventors: Daniel Thürmer, Stockdorf (DE); Sebastian Sonnek, Stockdorf (DE)

(73) Assignee: WEBSTO SE, Stockdorf (DE)

( * ) Notice: Subject to any disclaimer, the term of this patent is extended or adjusted under 35 U.S.C. 154(b) by 0 days.

(21) Appl. No.: 16/611,390

(22) PCT Filed: May 4, 2018

(86) PCT No.: PCT/EP2018/061558
§ 371 (c)(1),
(2) Date: Nov. 6, 2019

(87) PCT Pub. No.: WO2018/206446
PCT Pub. Date: Nov. 15, 2018

(65) Prior Publication Data
US 2020/0203906 A1 Jun. 25, 2020

(30) Foreign Application Priority Data

May 8, 2017 (DE) ..................... 10 2017 109 866.6

(51) Int. Cl.
*H01R 13/44* (2006.01)
*H01R 31/00* (2006.01)
(Continued)

(52) U.S. Cl.
CPC ......... *H01R 31/005* (2013.01); *B60R 16/023* (2013.01); *G05B 15/02* (2013.01);
(Continued)

(58) Field of Classification Search
CPC .. H01R 31/005; H01R 31/06; H01R 2201/20; H01R 2201/26; B60R 16/023; G05B 15/02; G07C 5/008; G07C 5/0808; G07C 5/0825
(Continued)

(56) References Cited

U.S. PATENT DOCUMENTS 5,683,261 A    11/1997  Ahles
7,922,520 B2 *  4/2011  Mizukami ........ H01R 13/65912
                                        439/493
(Continued)

FOREIGN PATENT DOCUMENTS

DE    102015112266 A1   2/2016
RU      2010154162 A    7/2012

OTHER PUBLICATIONS

International Searching Authority. International Search Report and Written Opinion for application PCT/EP2018/061558. Dated Jul. 20, 2018. With Translation.
(Continued)

*Primary Examiner* — Khiem M Nguyen
(74) *Attorney, Agent, or Firm* — Quarles & Brady LLP

(57) ABSTRACT

A system for the read-out of vehicle data via a diagnostic port, specifically an OBD plug connection of a vehicle, including a connector unit for a diagnostic port of a vehicle, and a gateway apparatus for communication with an air-conditioning installation of the vehicle, specifically a parking heater, wherein the connector unit, specifically the OBD plug connection, includes a connector body, having a plug-in side with first contacts for connection with the diagnostic port, and a connection side with second contacts, specifically for connection with a diagnostic device, and at least one branch feeder, wherein the branch feeder is brought out of
(Continued)

the connector body from at least one of the first contacts, and is communicatively connected to the gateway apparatus.

18 Claims, 5 Drawing Sheets

(51) Int. Cl.
    *B60R 16/023*     (2006.01)
    *G05B 15/02*     (2006.01)
    *G07C 5/00*     (2006.01)
    *G07C 5/08*     (2006.01)
    *H01R 31/06*     (2006.01)

(52) U.S. Cl.
    CPC ........... *G07C 5/008* (2013.01); *G07C 5/0808* (2013.01); *G07C 5/0825* (2013.01); *H01R 31/06* (2013.01); *G07C 2205/02* (2013.01); *H01R 2201/20* (2013.01); *H01R 2201/26* (2013.01)

(58) Field of Classification Search
    USPC .................................................. 429/502–506
    See application file for complete search history.

(56) References Cited

U.S. PATENT DOCUMENTS

| | | | | |
|---|---|---|---|---|
| 8,626,375 | B2* | 1/2014 | Miller | ................... B60R 16/02 701/29.1 |
| 10,553,993 | B2* | 2/2020 | Allen | ..................... H02G 3/045 |
| 2008/0268662 | A1 | 10/2008 | Krivtsov | |
| 2010/0010705 | A1 | 1/2010 | Duddle | |
| 2011/0106371 | A1 | 5/2011 | Jardine | |
| 2016/0042578 | A1 | 2/2016 | Whitehead | |
| 2017/0039784 | A1 | 2/2017 | Gelbart | |

OTHER PUBLICATIONS

Russia Federal Institute of Industrial Property. Translation of Search Report for application 2019139958/11(078519). Completed on Aug. 25, 2020.

Russia Federal Institute of Industrial Property. Translation of Office Action for application 2019139958/11(078519). Dated Aug. 25, 2020.

* cited by examiner

OBD ADAPTER

CROSS-REFERENCE TO RELATED APPLICATIONS

This application represents the national stage entry of PCT International Patent Application No. PCT/EP2018/061558 filed on May 4, 2018 and claims priority to German Patent Application No. DE 10 2017 109 866.6 filed May 8, 2017. The contents of each of these applications are hereby incorporated by reference as if set forth in their entirety herein.

DESCRIPTION

The disclosure relates to a system for the read-out of vehicle data via a diagnostic port of a vehicle, to a vehicle having such a system, and to a method for the retrofitting of an air-conditioning installation in a vehicle.

The retrofitting of an air-conditioning installation, specifically of a parking heater or an auxiliary heater, involves the retrospective fitting of various components of the air-conditioning installation in the vehicle, and the connection thereof to various factory-installed components of the vehicle, including, for example, the vehicle battery, the fuel tank, an air blower or an air blower switch of the vehicle. Specifically, the connection of a retrofittable air-conditioning installation to existing vehicle electrics or electronics is complicated, laborious and prone to error.

In state-of-the art vehicles, bus systems are employed for communication between the various components of the vehicle. In many cases, the bus systems of a vehicle are safety-critical, and are not readily accessible for the fitting of retrofittable components. Firstly, in many cases, vehicle manufacturers make no provision for additional ports on existing communication systems. Secondly, any potentially available ports are specific to a particular vehicle manufacturer, and are not compatible with the connections of a retrofittable air-conditioning installation. Within a state-of-the art vehicle, substantial quantities of vehicle data detected by sensors are available, which relate to the operating states of vehicle components or systems, or to measured variables detected by said sensors. These vehicle data are communicated by means of control devices within the vehicle, via bus systems. These vehicle data are also relevant to the control of a retrofittable air-conditioning installation, for example in order to permit the most effective and efficient operation thereof, specifically in conjunction with other vehicle systems.

At present, for the retrofitting of an air-conditioning installation, it is frequently necessary for existing communication lines to be separated or interrupted, in order to insert appropriate connections for a retrofittable air-conditioning installation, via which available vehicle data can be accessed. Retrofitting interventions of this type can result in malfunctions in existing on-board communications, if they are not properly executed. Moreover, retrofitting is time-consuming as a result.

Vehicles typically incorporate a prescribed and standardized on-board vehicle diagnostic system, often described as "OBD" (for "On-Board Diagnosis"). A diagnostic device can be connected to a diagnostic port which is provided on a vehicle as standard, in order to allow the execution of a fault diagnosis for the vehicle in a garage.

Proceeding from the prior art, the object of the present disclosure is to permit simpler, more reliable and more rapid on-board access to available vehicle data. Specifically, it is intended that existing vehicle data should be available for the control of a retrofittable air-conditioning installation. Specifically, it is intended that access to available vehicle data in a plurality of different vehicle types, and in the vehicles of different vehicle manufacturers, should be provided in the most universal manner possible.

This object is fulfilled by a system according to claim 1.

Specifically, this object is fulfilled by a system for the read-out of vehicle data via a diagnostic port, specifically an OBD plug connection of a vehicle, comprising
    a connector unit for a diagnostic port of a vehicle, and
    a gateway apparatus for communication with an air-conditioning installation of the vehicle, specifically a parking heater, wherein the connector unit, specifically the OBD plug connection, comprises a connector body, having a plug-in side with first contacts for connection with the diagnostic port, and a connection side with second contacts, specifically for connection with a diagnostic device, and at least one branch feeder, wherein the branch feeder is brought out of the connector body from at least one of the first contacts, and is communicatively connected to the gateway apparatus.

A diagnostic port of a vehicle, specifically of a motor vehicle, is preferably to be understood as a standardized port, specifically a standardized plug-in connection for a diagnostic interface of the vehicle. Specifically by means of a diagnostic port which is provided in a vehicle as standard, control devices of the vehicle or an error memory can be addressed, and vehicle data from the control devices or the error memory can be read-out via the diagnostic port. Typically, vehicle data read-out from a diagnostic device which is connected to the diagnostic port are employed for fault diagnosis on the vehicle, for example during an inspection of the vehicle in a garage.

Specifically, the gateway apparatus is configured to receive vehicle data and, on the basis thereof, to generate control commands for the control of an air-conditioning installation such as, for example, a parking heater or an auxiliary heater. The system can additionally incorporate sensors, specifically a temperature sensor for the detection of an external temperature, which record vehicle data for delivery to the gateway apparatus. The gateway apparatus specifically comprises an appropriate, specifically a multi-pole port for connection with a branch feeder plug connector on the branch feeder of the connector unit. Preferably, the gateway apparatus is configured to receive a PID (Parameter ID) which is read-out from a diagnostic port of the vehicle via the connector unit in the form of a data record, and to interpret vehicle data contained therein, preferably on the basis of the OBD-2-Standard. Preferably, by means of the connector unit, the system executes a read-out of at least one engine speed and one coolant temperature, and/or status data relating to a stop-start function of the engine control system via the diagnostic port of the vehicle. The operating status of the vehicle ignition can also be detected by the gateway apparatus.

One concept of the disclosure, by means of a diagnostic port of a vehicle, is to access available vehicle data, and specifically to employ the latter for the control of a retro-fitted air-conditioning installation, preferably a parking heater or an auxiliary heater. Preferably, during the operation of the vehicle, the connector unit remains continuously connected to the diagnostic port of the vehicle, and is specifically plugged therein. In this manner, vehicle data can be accessed during both the operation and the immobilization of the vehicle, immediately said data are available within the vehicle or are delivered to the diagnostic port. Vehicle data transmitted from the diagnostic port via the first contacts of the connector unit can be transmitted via one or more branch feeder(s) to another location in the vehicle, where they can preferably be employed for the generation of control commands for an air-conditioning installation. The system according to the disclosure provides an advantage in that, for the retrofitting of an air-conditioning installation, no intervention in the existing vehicle communication systems is required, as vehicle information can be read-out via a diagnostic port of the vehicle which is then employed in a gateway apparatus for the control of the air-conditioning installation. The system can be simply, rapidly and reliably installed. It is versatile in use, and has no disruptive influences upon existing vehicle systems.

Specifically, the first and second contacts are electrically conductive, are preferably formed of a metallic material and, according to the disclosure, can be understood as contact points. Specifically the first and second contacts respectively are mutually electrically insulated. A first and a second contact can respectively be provided on an integral contact element, or on separate contact elements. Specifically, a branch feeder is connected to a first contact in an electrically conductive manner, preferably by soldering or clamping. Preferably, for each first contact via which the required vehicle information is to be transmitted, one branch feeder is provided. A plurality of branch feeders can be brought out individually or in combination from the connector body, can be specifically enclosed in a common jacket, or twisted together. Specifically, the branch feeder is configured for the transmission of vehicle data.

The connector body can be of a one-piece or a multi-piece design, and specifically comprises a housing, preferably of plastic. The plug-in side and the connection side are preferably arranged in mutual opposition, but might also be configured e.g. in a corner arrangement. The body specifically assumes a cylindrical, for example a cuboid basic shape. The plug-in side is preferably configured to match the shape of the diagnostic port and, in the plugged-in state, in addition to an electrical connection by means of the first contacts, specifically further provides a mechanical connection, e.g. by means of a force-fitted and/or form-fitted clamping arrangement. Additional latching or clamping elements can be provided, in order to ensure the secure seating of the connector unit on the diagnostic port. The plug-in side is preferably configured as a mating part to the diagnostic port, and the connection side is configured identically to said diagnostic port. The plug-in side and the connection side preferably assume a standardized connector profile.

By means of a system according to the disclosure, having a connector unit, any intervention in the on-board communication lines for vehicle data, for example cable harnesses or data buses, is not necessary. The connector unit can be fitted to a diagnostic port in a simple, rapid and error-free manner. A connector unit for a diagnostic port provides an advantage, in that diagnostic ports for vehicles are typically standardized and, accordingly, the same connector unit can be employed for a variety of different vehicle types. The connection side, with the second contacts, is preferably configured such that the functionality of the diagnostic port is maintained, even where the connector unit is plugged in. Specifically, it is still possible to connect a diagnostic device to the diagnostic port by means of a plugged-in connector unit.

In an advantageous further development of the disclosure, at least one first contact is electrically connected to an associated second contact. It is thus ensured that an electrical signal transmitted via the first contact can be picked up on the associated second contact, for example by means of a connected diagnostic device. It is conceivable that only individual first contacts, specifically those contacts which are relevant to a vehicle diagnosis, are connected to a second contact. Specifically, a majority, or preferably all the first contacts are electrically connected to a respectively associated second contact. Accordingly, all electrical signals which are available for pick-up on the diagnostic port of the vehicle can be picked up on the connection side of the connector unit. The original function of the diagnostic port is thus maintained in full.

In an advantageous further development of the disclosure, the plug-in side and/or the connection side are/is configured as an OBD-2 plug connection. An OBD-2- or OBD-II plug connection is a standardized 16-pole plug connection according to SAE Standard J/1962, which is incorporated as standard in many vehicles as a diagnostic port. By the configuration of the plug-in side as an OBD-2 plug connection, a high degree of compatibility of the system according to the disclosure, having a connector unit, with a wide variety of different vehicle types is ensured.

In a further development of the disclosure, the plug-in side is configured as a male OBD plug connection, specifically for connection to a female OBD socket of a vehicle, and/or the connection side is configured as a female OBD plug connection. Typically, the diagnostic port of vehicles is configured as a female OBD plug connection, specifically as an OBD-2 socket. Correspondingly, diagnostic devices for connection to the diagnostic port of the vehicle typically incorporate a male OBD plug connection. By the embodiment of the plug-in side as a male OBD plug connection, specifically as a male OBD-2 plug connection, specifically having pins by way of first contacts, compatibility with the diagnostic port which is provided in the vehicle as standard is ensured.

In a further development of the disclosure, at least one branch feeder is configured as a, preferably bidirectional, communication line, specifically as a data bus line or a C-line. Specifically, the branch feeder is configured as an electrical conductor, specifically as a wire, which is connected at one end to a first contact within the connector body and, at its other end, preferably constitutes a connection contact. Specifically, the branch feeder is configured to relay vehicle data which is transmitted via the first contact which is connected thereto, and specifically to conduct said data out of the connector body.

In a further development of the disclosure, the connector body comprises a, preferably lateral, branch feeder opening, through which the at least one branch feeder is brought out of the connector body. A branch feeder opening is specifically provided by way of a cut-out in a housing of the connector body, as a passage for the branch feeder. The branch feeder opening is preferably provided in a sidewall of the connector body, but might also be arranged on an end face of the connector body. A lateral arrangement provides an advantage, in that the connector unit as a whole can be configured to a flatter design, if the branch feeder is fed out to the side.

In one potential form of embodiment, a branch feeder connection, specifically a plug socket, is integrated in the connector body, wherein the branch feeder is preferably only routed within the connector body, and is connected to the branch feeder. In this case, a separate line would be provided, which is connectable to the branch feeder connection, in order to conduct vehicle data from the connector unit to another location in the vehicle.

In a further development of the disclosure, the branch feeder, preferably at its terminal end, is connected to a branch feeder plug connector, wherein specifically a plurality, and preferably all the branch feeders are connected to a common branch feeder plug connector. However, the branch feeder might also be configured as a Y-connection, wherein a branch feeder plug connector can respectively be provided at either terminal end. A branch feeder plug connector can be any, preferably standardized plug connector, which is specifically appropriate for connection to a gateway apparatus. Specifically, the branch feeder plug connector is configured to a multi-pole, for example a 16-pole or 12-pole design, but is preferably not a standardized OBD plug connector, and specifically not an OBD-2 plug connector. Preferably, the branch feeder plug connector has a smaller number of poles than the number of first contacts, specifically corresponding to the number of poles of the diagnostic port of the vehicle. Specifically, the assignment of pins on the branch feeder plug connector differs from the assignment of pins on the diagnostic port. By means of a branch feeder plug connector, the branch feeders are simply and reliably connectable, for example to a gateway apparatus.

In a further development of the disclosure, the connector body has a height of less than 70 mm, preferably less than 60 mm, further preferably less than 50 mm, further preferably less than 40 mm, further preferably less than 30 mm, further preferably less than 20 mm, and further preferably less than 10 mm. By means of the flattest possible construction of the connector body, the connector unit can be plugged into the diagnostic port of a vehicle in a space-saving manner. A flat connector unit can preferably be passed to the rear of a facing, which typically covers the diagnostic port of the vehicle in the vehicle interior.

In a further development of the disclosure, a first branch feeder is connected to a first contact which, in the plugged-in state of the connector unit, is in contact with a first data bus line of a vehicle, and specifically with connection 6 of an OBD-2 plug connection, and a second branch feeder is connected to a first contact which, in the plugged-in state of the connector unit, is in contact with a second data bus line of a vehicle, and specifically with connection 14 of an OBD-2 plug connection. A first and second data bus line of a vehicle are, for example the "CAN High" and "CAN Low" lines of a CAN bus system (Controller Area Network) which, e.g. in a standard assignment of an OBD-2 plug connection, are arranged on the contact lugs or pins 6 and 14. However, a branch feeder might also be an individual data bus line, for example a C-line, to which e.g. connection 7 of an OBD-2 plug connection is assigned. Data bus lines of various on-board bus systems, e.g. a LIN bus, a CAN bus or a FlexRay bus, might be provided by way of branch feeders, provided that said bus systems are connected to the diagnostic port of the vehicle.

In a further development of the disclosure, the gateway apparatus comprises a data storage apparatus, which is configured for the recording of vehicle data which are read-out via the diagnostic port, specifically the temporal characteristic thereof, preferably in order to permit the subsequent retrieval of said vehicle data. Specifically, the data storage apparatus records a temporal sequence of vehicle data, for example of a temperature, pressure, acceleration and/or speed and/or status value which is read-out via the diagnostic port. Specifically, vehicle data thus read-out are saved in a database as previous values or historical values (in a historian database). Preferably, vehicle data thus saved are delivered to the gateway apparatus, if required, for the generation of control commands, specifically are read-out from the data storage apparatus, and specifically in the event that access to instantaneous vehicle data via the diagnostic port is not possible, or the requisite vehicle data are not being communicated on an on-board bus system, and are thus temporarily not available for read-out on the diagnostic port. The gateway apparatus can then access vehicle data which are saved in the data storage apparatus, for the generation of control commands.

In a further development of the disclosure, the system further comprises a control device for an air-conditioning installation of the vehicle, wherein the gateway apparatus is communicatively connected to the control device via a data bus. The control device is preferably assigned to a heating device of an air-conditioning installation, but can also be assigned to components which are appropriate for cooling. The control device is, for example, connected to the gateway apparatus by means of a proprietary bus, e.g. a W bus or a LIN bus. The control device is restricted in its functionality, wherein it is preferably configured for the reception of control commands from the gateway apparatus and e.g. for the conversion thereof into analogue signals for the actuation of a heating device. The gateway apparatus specifically comprises at least one bus connection, specifically a bus controller, and a transmitter/receiver unit (transceiver). The gateway apparatus is specifically configured for communication with an operator control device for the air-conditioning installation, for example a smartphone, a preselection timer, a temperature regulator, a remote control device or an on-board computer, specifically via a data bus line, for example a W bus and/or via a radio link. Optionally, the gateway apparatus can also be connected directly to an existing vehicle bus system.

The above-mentioned object is further fulfilled by a vehicle according to claim 13, specifically by a vehicle incorporating a system according to the disclosure.

The above-mentioned object is further fulfilled by a method according to claim 14, specifically by a method for the retrofitting of an air-conditioning installation, specifically a parking heater, in a vehicle, comprising the following steps:

Installation of the components of the air-conditioning installation in the vehicle;

Connection of a diagnostic port, specifically an OBD plug connection, of the vehicle to the air-conditioning installation, by the plugging of a connector unit having a branch feeder, preferably a connector unit according to the disclosure, into the diagnostic port.

The method according to the disclosure has similar advantages to those described above with reference to the system according to the disclosure. The method can moreover implement some or all of the process engineering characteristics described with reference to the connector unit and the system. Connection of the diagnostic port to the air-conditioning installation can be understood as a direct or indirect connection. In the event of indirect connection, an (intelligent) gateway apparatus can specifically be interposed.

In an advantageous further development of the method according to the disclosure, the following steps are additionally provided:

Mounting a gateway apparatus in the vehicle for communication with the air-conditioning installation;

Connecting the diagnostic port to the gateway apparatus in a first connection step, specifically by means of the branch feeder of a connector unit which is plugged into the diagnostic port;

Connecting the gateway apparatus to the air-conditioning installation, specifically to a control device of the air-conditioning installation, by means of a data bus, in a second connection step.

The sequence of process steps is interchangeable. The above-mentioned first and second process steps for the connection of the gateway apparatus specifically constitute sub-steps of the connection of the diagnostic port of the vehicle to the air-conditioning installation. In principle, however, it is also conceivable for the diagnostic port to be connected directly to the control device of the air-conditioning installation, without the interposition of a gateway apparatus. Vehicle data read-out from the diagnostic port might then be employed directly for the purposes of control, by means of a correspondingly configured control device of the air-conditioning installation. A control device is specifically restricted in its functionality, wherein it is preferably configured for the reception of control commands from the gateway apparatus, and the conversion thereof e.g. into analogue signals for the actuation of a heating device.

Exemplary embodiments of the disclosure are described in greater detail hereinafter, with reference to the drawings. In the drawings.

In the following description of the disclosure, identical and identically-functioning elements are identified by the same reference numbers.

Figure 1A:
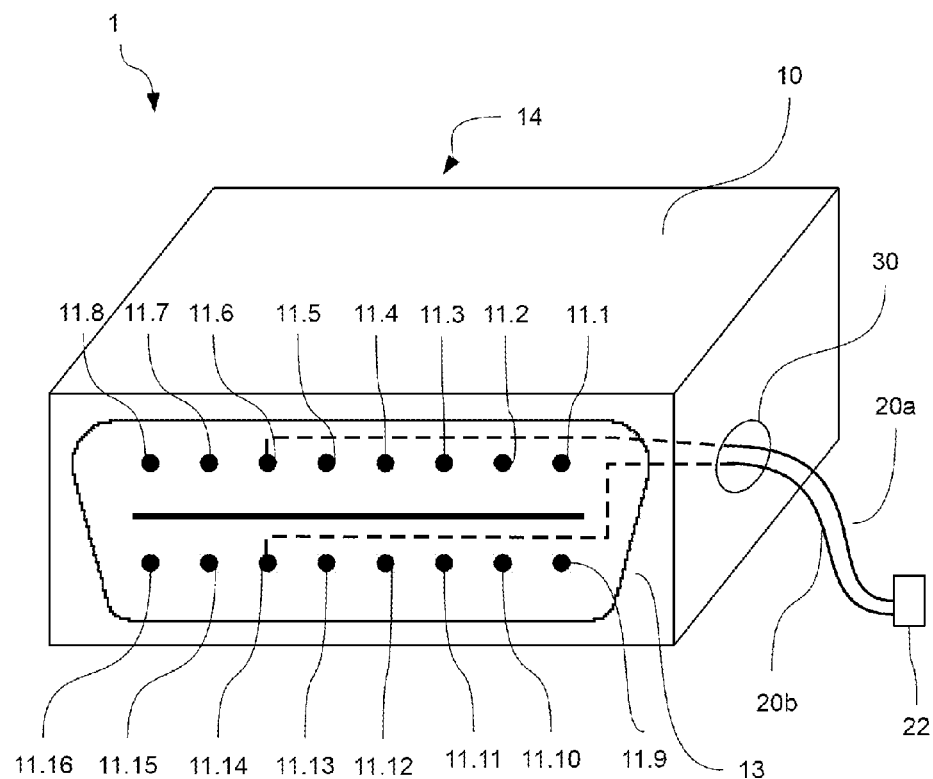
FIG. 1A shows a schematic representation of one form of embodiment of the connector unit of a system according to the disclosure, in a perspective view.
Figure 1B:
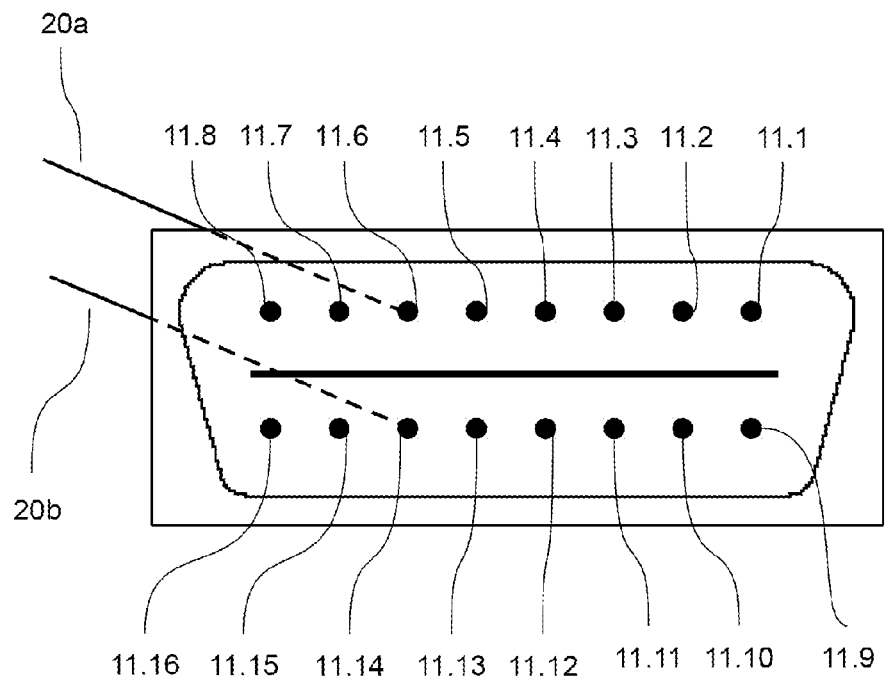
FIG. 1B shows a schematic representation of the form of embodiment of the connector unit according to FIG. 1A in a frontal view.
Figure 1C:
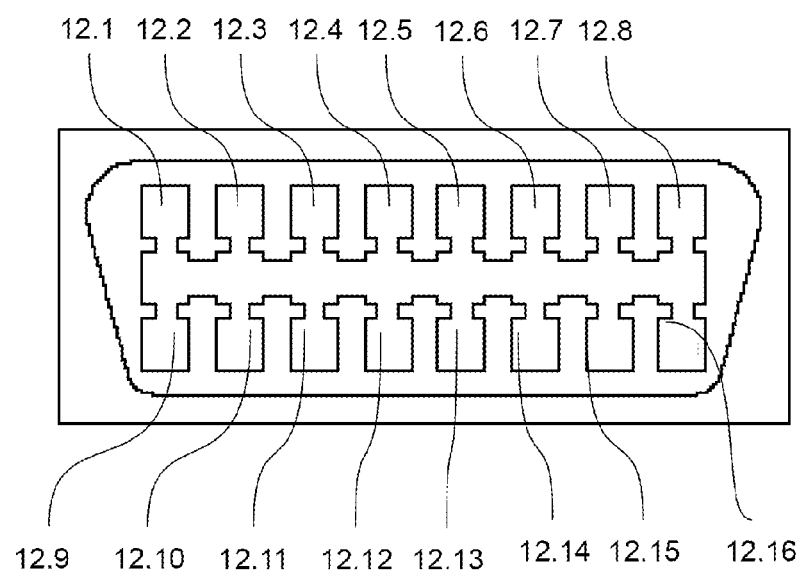
FIG. 1C shows a schematic representation of the form of embodiment of the connector unit according to FIG. 1A, in a rear view.
Figure 1D:
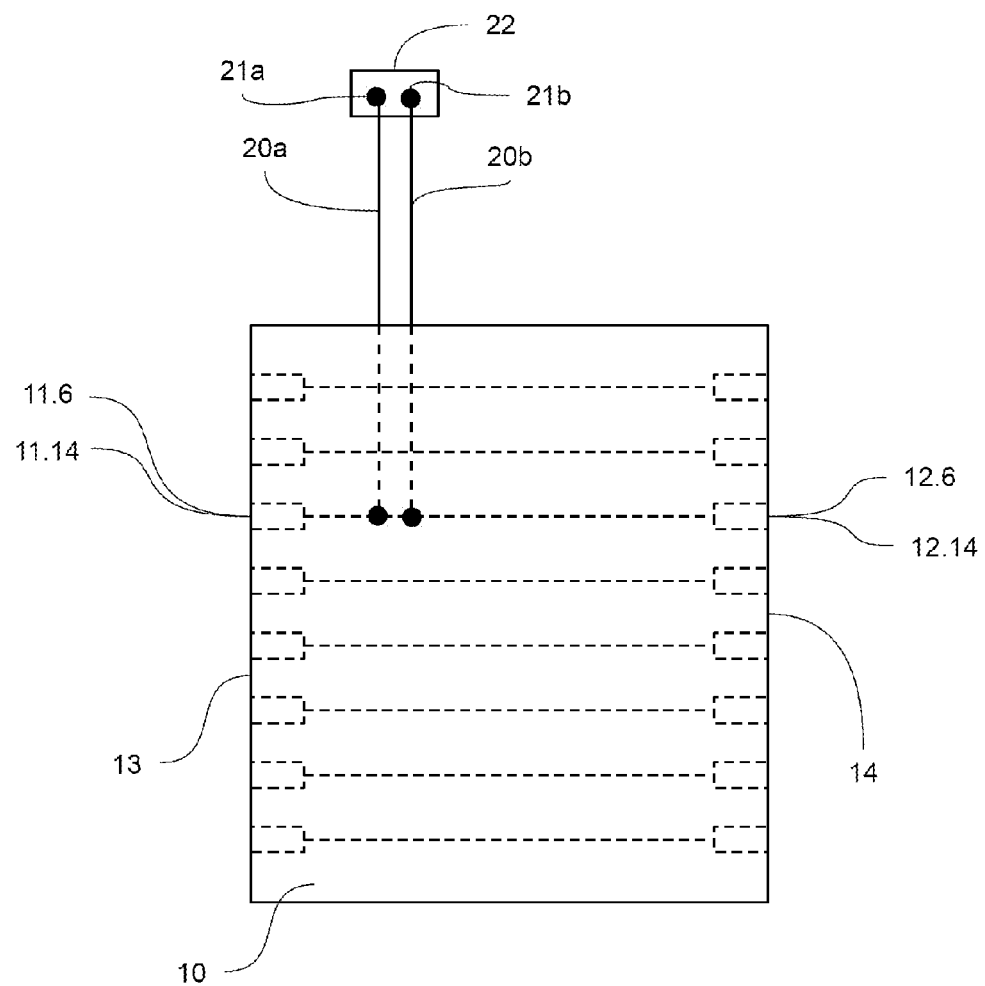
FIG. 1D shows a schematic representation of the form of embodiment of the connector unit according to FIG. 1A, in an overhead view.

FIGS. 1A to 1D show various views of a connector unit 1 of a system 100 according to the disclosure, wherein FIG. 1A represents a view of the plug-in side 13, by way of the front side, and FIG. 1B represents a view of the connection side 14, by way of the rear side. The connector unit 1 comprises a connector body 10 which, in this case, assumes a basic cuboid shape. The plug-in side 13 is configured here as a male plug connection, with pin-shaped first contacts 11.1 to 11.16, whereas the connection side 14 is configured as a female plug connection with a plug socket, in which second contacts 12.1 to 12.16 are arranged. Conversely, however, the plug-in side 13 could also be configured as a female, and the connection side 14 as a male plug connection. Alternatively, the plug-in side 13 and the connection side 14 can each be configured identically, such that the connector body 1 assumes the function of an inverting adapter (gender changer). The plug-in side 13 and the connection side 14 are respectively configured here as 16-pole plug connectors, each having sixteen first or second electrical contacts 11.1 to 1.16, or 12.1 to 12.16. From FIG. 1D, it is clear that each first contact 11.1 to 11.16 is electrically connected to a respectively associated second contact 12.1 to 12.16 within the connector body 10, wherein the first and second contacts can be arranged on a common, specifically a metallic contact element, or on separate contact elements which are mutually interconnected, for example, by means of connecting cable segments. In this case, the plug-in side 13 and the connection side 14 are respectively configured as a standardized 16-pole OBD-2 plug connection, wherein the connection side 14 constitutes a female mating component to the male plug-in side 13. This provides an advantage, in that the connector unit 1 is connectable to a diagnostic port 2 of a vehicle 3, and is specifically pluggable therein, which is typically provided as standard in vehicles in the form of a standardized female OBD-2 plug socket (see FIGS. 2 and 3). Typically, the OBD connection in vehicles, specifically in motor vehicles, is concealed behind a facing on the dashboard, or in the lower part of the driver's seat. The connector unit 1 is preferably configured to the flattest possible design, such that a facing can still pass over the connector unit 1, even where the latter is plugged into the diagnostic port 2. According to the disclosure, the connector unit 1, upon the retrofitting of an air-conditioning installation 130 (see FIG. 3), is plugged into the diagnostic port 2 and remains there continuously during the operation of the vehicle 3.

In the form of embodiment of the connector unit 1 represented in FIGS. 1A to 1D, two branch feeders 20a, 20b are brought out of the connector body 10 through a laterally arranged branch feeder opening 30 on said connector body 10. The branch feeders 20a, 20b are configured as data bus lines, each of which is connected to a specific first contact within the connector body 10, wherein one branch feeder 20a, 20b respectively branches off from a selected electrically-conductive connection between a specific first and an associated second contact. The connection contacts 21a or 21b configured at the terminal ends of the branch feeders 20a and 20b are arranged in a common branch feeder plug connector 22. By means of the connector unit 1, with the branch feeders 20a, 20b, available vehicle data within a vehicle 3 can be read-out via the diagnostic port 2, and relayed for employment at another location in the vehicle 3. The number and the connection of the branch feeders with first contacts 11.1 to 11.16 is selected such that access to the relevant plug connections on the diagnostic port 2 is ensured, and thus specifically such that lines are branched off from the diagnostic port 2, via which the requisite vehicle data are communicated within the vehicle. As all the first and second contacts 11.1 to 11.16 or 12.1 to 12.16 respectively are mutually electrically interconnected, and the connection side 14 is configured to emulate the diagnostic port 2, the full original functionality of the diagnostic port 2 is maintained such that, even where the connector unit 1 is plugged in, a diagnostic device can be connected to the diagnostic port 2, in order to permit the execution of a fault diagnosis for the vehicle 3 in a garage.

In the present exemplary embodiments according to FIGS. 1A to 1D, 2 and 3, which are based upon an OBD-2 plug connector by way of a diagnostic port 2, the branch feeder 20a is connected to the first contact 11.6, which corresponds as standard to pin n° 6 of an OBD-2 plug connector, which is assigned to the CAN High line of a CAN bus system. The branch feeder 20b is connected to the first contact 11.14, which corresponds as standard to pin n° 14 of an OBD-2 plug connector, which is assigned to the CAN Low line of a CAN bus system. An on-board vehicle bus 4, on which vehicle data are communicated, is configured here as a CAN bus system, the data bus lines of which are connected to the OBD-2 diagnostic port 2 of the vehicle 3. In this manner, vehicle data communicated on-board on the CAN bus system can be read-out from the diagnostic port 2 via the connector unit 1 and, specifically, vehicle data can be retrieved from an on-board control device or sensor by way of a standard OBD-2 PID (Parameter ID), e.g. via the gateway apparatus 110.

Figure 2:
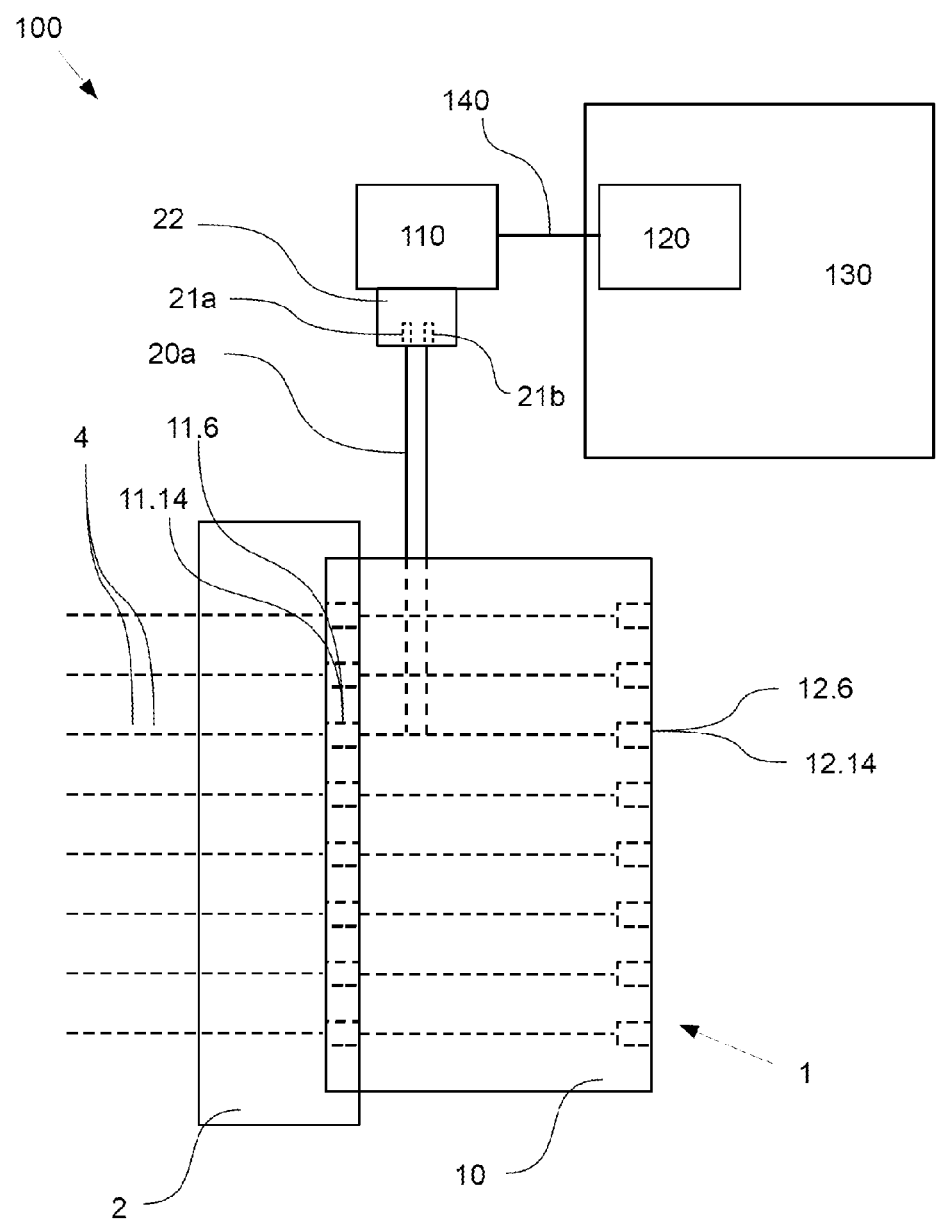
FIG. 2 shows a schematic representation of one form of embodiment of a system according to the disclosure, having a connector unit according to FIGS. 1A to 1D.

FIG. 2 shows a schematic representation of a system 100 according to the disclosure for vehicle data via the diagnostic port 2 of the vehicle 3. The connector unit 1 is plugged into the OBD-2 socket which is provided as standard by way of a diagnostic port 2. The branch feeders 20a, 20b are connected to a gateway apparatus 110 via the branch feeder plug connector 22. The gateway apparatus 110 is connected via a data bus 140 to a control device 120 of an air-conditioning installation 130, specifically of a heating device, and is configured, on the basis of vehicle data read-out from the diagnostic port 2, to generate control commands for the control of the air-conditioning installation 130, specifically of a heating device. On the gateway apparatus 110, additional vehicle data, specifically sensor data, for example an external temperature detected by a temperature sensor, can be communicated via further bus systems which are connected to the gateway apparatus 110, for example a LIN bus or any other bus, which can also be considered in the generation of control commands. The system 100 according to the disclosure is specifically appropriate for the retrofitting of an air-conditioning installation 130 in a vehicle 3. By means of the connector unit 1, vehicle data such as, for example, an engine speed, a coolant temperature and/or status data relating to a stop-start function of the engine control system, can be read-out via the diagnostic port 2 of the vehicle, without the necessity for any intervention in, or modification of existing communication systems of the vehicle 3, e.g. on-board bus systems or cable harnesses.

Figure 3:
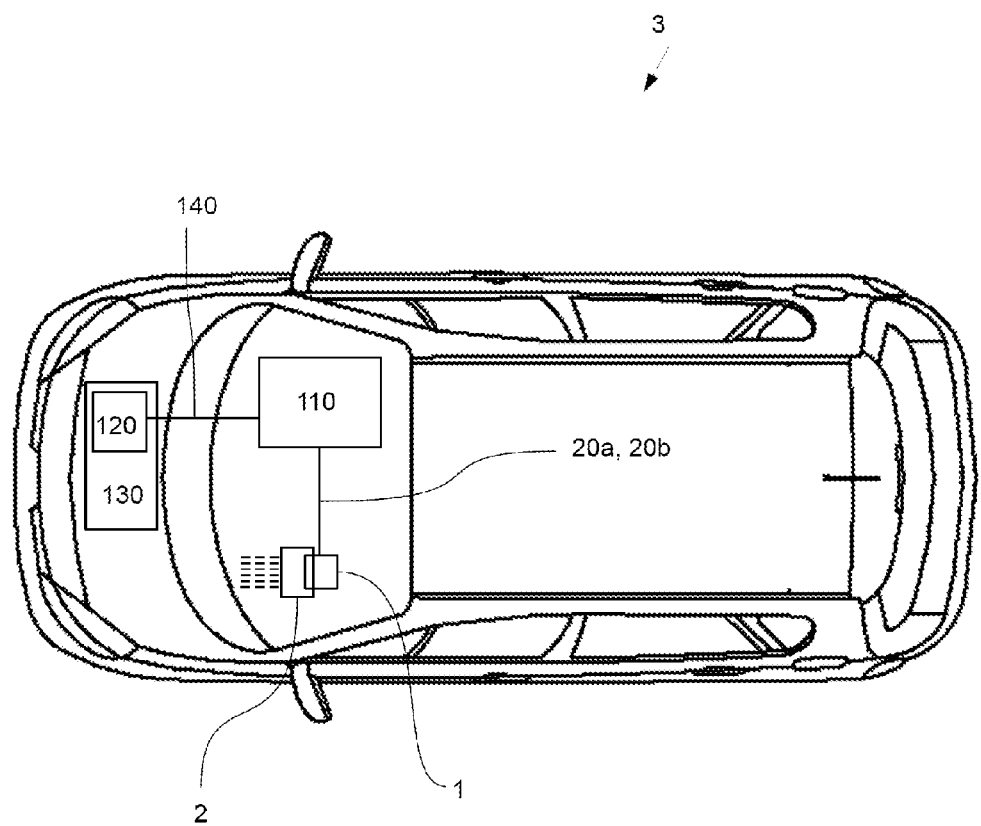
FIG. 3 shows a schematic representation of one form of embodiment of a vehicle according to the disclosure, having a system according to FIG. 2.

FIG. 3 represents a vehicle 3 having a retrofitted air-conditioning installation 130, such as a parking heater or an auxiliary heater, wherein a system 100 according to the disclosure is installed in the vehicle 3.

At this point, it is observed that all the above-mentioned elements, considered individually or in any combination, specifically the details thereof represented in the drawings, are claimed as key to the disclosure. Variations herefrom will be familiar to a person skilled in the art. Specifically, the combination of the individual embodiments in any desired form will be commonplace to a person skilled in the art.

LIST OF REFERENCE NUMBERS

1 Connector unit
2 Diagnostic port
3 Vehicle
4 Vehicle bus
10 Connector body
11.1 to 11.16 First contact
12.1 to 12.16 Second contact
13 Plug-in side
14 Connection side
20a, 20b Branch feeder
21a, 21b Connection contact
22 Branch feeder plug connector
30 Branch feeder opening
100 System
110 Gateway apparatus
120 Control device
130 Air-conditioning installation
140 Data bus

The invention claimed is:

1. System for the read-out of vehicle data via a diagnostic port of a vehicle, comprising
a connector unit for a diagnostic port of a vehicle, and
a gateway apparatus for communication with an air-conditioning installation of the vehicle,
wherein the connector unit comprises a connector body having a plug-in side with first contacts for connection with the diagnostic port, and a connection side with second contacts, specifically for connection with a diagnostic device, and at least one branch feeder,
wherein the branch feeder is brought out of the connector body from at least one of the first contacts, and is configured as a bidirectional communication line, which is communicatively connected to the gateway apparatus.

2. System according to claim 1, wherein at least one first contact is electrically connected to an associated second contact.

3. System according to claim 1, wherein a majority of the first contacts are electrically connected to a respectively associated second contact.

4. System according to claim 1, wherein the plug-in side and/or the connection side are/is configured as an OBD-2 plug connection.

5. System according to claim 1, wherein the plug-in side is configured as a male OBD plug connection and/or the connection side is configured as a female OBD plug connection.

6. System according to claim 1, wherein the connector body comprises a branch feeder opening, through which the at least one branch feeder is brought out of the connector body.

7. System according to claim 1, wherein the branch feeder is connected to a branch feeder plug connector, wherein a plurality of the branch feeders are connected to a common branch feeder plug connector.

8. System according to claim 1, wherein the connector body has a height of less than 70 mm.

9. System according to claim 1, wherein a first branch feeder is connected to a first contact which, in the plugged-in state of the connector unit, is in contact with a first data bus line of a vehicle, and a second branch feeder is connected to a first contact which, in the plugged-in state of the connector unit, is in contact with a second data bus line of a vehicle.

10. System according to claim 1, wherein the system further comprises a control device for an air-conditioning installation of the vehicle, wherein the gateway apparatus is communicatively connected to the control device via a data bus.

11. System according to claim 1, wherein the gateway apparatus comprises a data storage apparatus, which is configured for the recording of vehicle data which are read-out via the diagnostic port.

12. Vehicle comprising a system according to claim 1.

13. Method for the retrofitting of an air-conditioning installation in a vehicle, comprising the following steps:
Installation of the components of the air-conditioning installation in the vehicle;
Connection of an OBD plug connection, of the vehicle to the air-conditioning installation, by the plugging of a connector unit having a branch feeder into the diagnostic port, wherein the branch feeder is configured as a bidirectional communication line.

14. Method according to claim 13, further comprising
Mounting a gateway apparatus in the vehicle for communication with the air-conditioning installation;

Connecting the diagnostic port to the gateway apparatus in a first connection step by means of the branch feeder of a connector unit which is plugged into the diagnostic port;

Connecting the gateway apparatus to the air-conditioning installation, specifically to a control device of the air-conditioning installation, by means of a data bus, in a second connection step.

15. System of claim 1, wherein the connector unit is an OBD plug connection, and the gateway apparatus is a parking heater.

16. System according to claim 1 wherein all of the first contacts are electrically connected to a respectively associated second contact.

17. System according to claim 1, wherein at least one branch feeder is configured as a data bus line or a C-line.

18. System according to claim 1, wherein the gateway apparatus comprises a data storage apparatus, which is configured for the recording of temporal vehicle data which are read-out via the diagnostic port.

* * * * *